Figure 1:
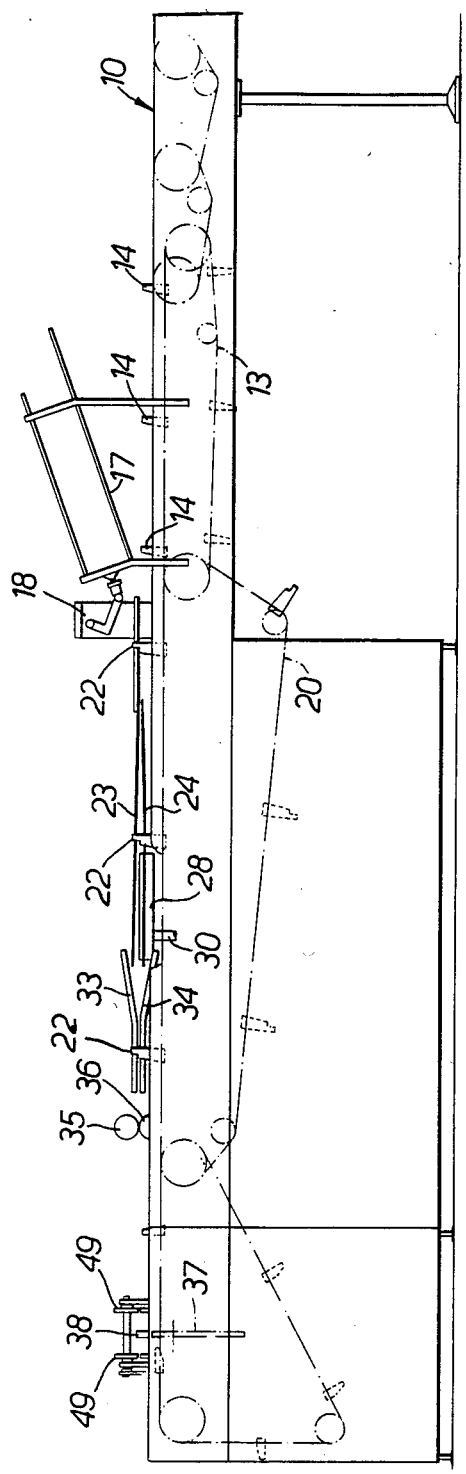

United States Patent [19]

Oakley

[11] Patent Number: 4,559,092

[45] Date of Patent: Dec. 17, 1985

[54] SEALING LIDS TO TRAY-LIKE CONTAINERS

[75] Inventor: John R. Oakley, Swindon, England

[73] Assignee: Metal Box Public Limited Company, Reading, England

[21] Appl. No.: 579,900

[22] PCT Filed: Apr. 26, 1983

[86] PCT No.: PCT/GB83/00123

§ 371 Date: Dec. 12, 1983

§ 102(e) Date: Dec. 12, 1983

[87] PCT Pub. No.: WO83/03807

PCT Pub. Date: Nov. 10, 1983

[30] Foreign Application Priority Data

Apr. 30, 1982 [GB] United Kingdom ............... 8212618

[51] Int. Cl.$^4$ ............................................. B32B 31/12
[52] U.S. Cl. ...................................... 156/69; 53/373; 156/443; 156/497; 156/499; 493/134
[58] Field of Search ............... 53/478, 487, 290, 373; 156/69, 497, 499, 443; 493/134, 192

[56] References Cited

U.S. PATENT DOCUMENTS

| | | |
|---|---|---|
| 3,508,376 | 4/1970 | Bemiss . |
| 3,610,114 | 10/1971 | Kaminsky . |
| 4,249,978 | 2/1981 | Baker .................... 156/291 |
| 4,282,699 | 8/1981 | Embro ..................... 156/69 X |
| 4,384,914 | 5/1983 | Mattiebe ................ 156/499 X |
| 4,387,551 | 6/1983 | Cowan .................... 156/69 X |

FOREIGN PATENT DOCUMENTS

| | | |
|---|---|---|
| 0017678 | 10/1980 | European Pat. Off. . |
| 1040672 | 9/1966 | United Kingdom . |
| 1071040 | 6/1967 | United Kingdom . |
| 1159497 | 7/1969 | United Kingdom . |
| 1306021 | 2/1973 | United Kingdom . |
| 1415725 | 11/1975 | United Kingdom . |
| 1446843 | 8/1976 | United Kingdom . |
| 1466673 | 3/1977 | United Kingdom . |

Primary Examiner—Robert A. Dawson
Attorney, Agent, or Firm—Burns, Doane, Swecker & Mathis

[57] ABSTRACT

In a method of sealing separate flat lids (16) on to a series of generally rectangular tray-like containers (11), particularly containers which are coated with a polyester such as polyethylene terephthalate for heat resistance, the containers are moved continuously along a line while a lid (16) is positioned with its margin in contact with a peripheral flange (26) on each container, marginal side portions (25) of the lid and/or the side portions of the container flange are bent, e.g. by profiled strips (23, 24) acting as ploughs, to form a V-shaped recess between them, hot air is directed into the recess, e.g. from elongated nozzles (31, 32), to activate adhesive within the recess and to heat the side portions (25, 26), after which the side portions are pressed into contact to seal them together, e.g. by profiled strips (33, 34) and pressure rollers (35, 36). The movement of the containers (11) is thereafter changed, e.g. by turning the line of movement through 90° or rotating each container through 90°, so that what were previously the end portions of the lid margin and container flange are presented at each side of the line of movement, and the marginal end portions (42) of the lids are sealed to the end portions (46) of the container flange to complete a peripheral seal between lid and container.

10 Claims, 12 Drawing Figures

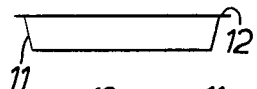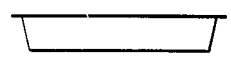
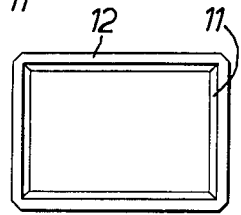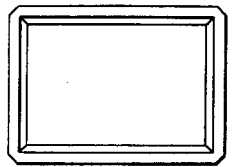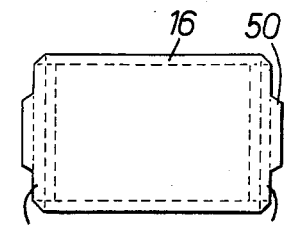
FIG. 3a.  FIG. 3b.  FIG. 3c.
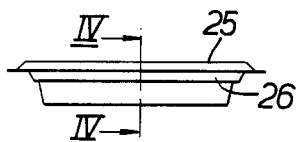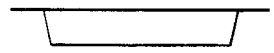
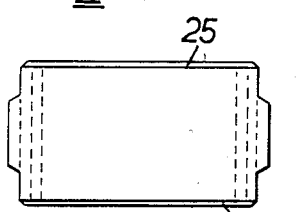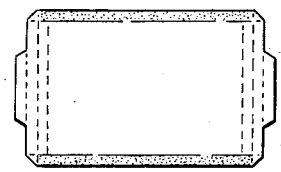
FIG. 3d.  FIG. 3e.
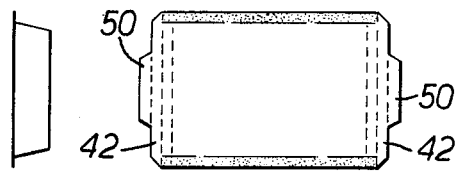
FIG. 3f.
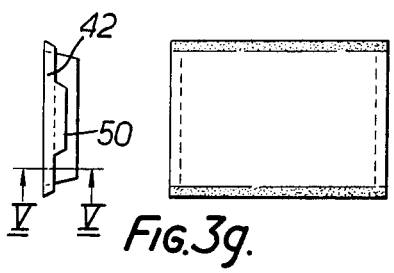
FIG. 3g.  FIG. 3h.

SEALING LIDS TO TRAY-LIKE CONTAINERS

This invention relates to the sealing of lids to tray-like containers, such as are used for packaging of a variety of goods, principally foodstuffs. The containers have peripheral horizontal flanges to which separate flat lids are sealed, and are generally rectangular in plan.

Both the containers and the lids are usually formed of a cardboard material having their interior surfaces (i.e. their surfaces destined to form the interior surface of the finished pack) coated with a polyester film, such as polyethylene terephthalate, for heat resistance. The polyester may also serve as a heat-activatable adhesive for sealing the lid to the container. Hitherto such sealing has been effected by use of a heated platen which is brought down on to the positioned lid and held there until fusion of the coatings on the lid margin and the upper surface of the container flange has been effected. This process is slow, of the order of 2 to 3 seconds per container, because the heating of the coatings is indirect, i.e. through the thickness of the lid. In most cases, motion of the container has to be stopped while the platen is applied. Also, the apparatus is not readily adaptable to changes in container size. A further disadvantage of the use of heated platens is that in some applications the coatings on the container and lid are not heat-sealable together with the bond strength required for the finished pack.

An object of the present invention is to provide a method of sealing lids to such tray-like containers which will enable the rate of production to be increased, which may be more easily adaptable to containers of different sizes, and/or which may be used in applications where the interior surfaces of the container and lid are not compatible or otherwise are difficult to heat-seal together.

According to the invention, a method of sealing separate flat lids at margins thereof on to a series of generally rectangular tray-like containers having peripheral horizontal flanges, which comprises moving the containers continuously along a line while positioning a lid with its margin located above the peripheral flange of a respective container and sealing the margin of the lid to the peripheral flange of the respective container, is characterized by bending marginal side portions of the lid and/or side portions of the flange of the container so that, with the lid so positioned over the container, a V-section recess is formed between the side portions of the lid and flange along each of opposed sides of the container parallel to the line of movement; providing a heat-activatable adhesive in said recesses; directing hot gas into the receses to activate the adhesive within them and to heat the side portions of the lid and flange; pressing the side portions of the lid and flange into contact to seal them together; changing the movement of the containers so that what were previously marginal end portions of the lid and end portions of the flange are presented at each side of the line of movement; and sealing the said end portions of the lid and flange together.

The method of the invention is thus carried out while moving the containers continuously along the line and the adhesive within the recesses is heated directly by the hot gas, e.g. air, so that production rates can be much increased, typically from 15 containers per minute with the prior art to 120 containers per minute using the present invention.

The heat-activatable adhesive may be an overall heat-resistant polyester film coating as mentioned above applied to the sheet material of which the containers and lids are made, or it may be an additional coating of adhesive applied to the lid margins and/or the flanges of the containers either before or after the formation of the recesses. The adhesive may be a water-based adhesive which is sprayed into the recesses as a fine mist, and which thereafter is rendered tacky by the hot gas, as proposed in our co-pending U.K. Patent Application No. 8204889.

Preferably the bending of the side portions of the lid and/or of the container flange is effected by a profiled strip on each side of the line of movement acting as a plough. The hot gas may be directed into the recesses from elongated nozzles arranged parallel to the line of movement. Preferably the pressing of the side portions of the lid and flange into contact is effected by vertically acting pairs of pressure rollers disposed above and below the side portions.

The change of movement of the containers may be effected by turning the line of movement through 90° while leaving the orientation of the containers unchanged, or by rotating each container through 90°.

The sealing between the side portions of the lid and flange may be effected between the interior surfaces of the lid and container above the container flange; alternatively it may be effected between the interior surface of an extended side portion of the lid and the exterior surface of the container beneath the container flange. Correspondingly, the end portions of the lid and flange may be sealed together above the container flange, or below the flange. The invention thus comprehends methods of sealing lids to generally rectangular containers in which the lids are sealed (a) only to the upper surfaces of the container flanges, (b) only to the lower surfaces of the container flanges, and (c) to the upper surfaces of the container flanges along two opposed sides of the container but to the lower surfaces of the container flanges along the other two sides of the container. In the latter respect it will be noted that no limitation to their relative lengths is to be inferred by the use of the words "side" and "end" in conjunction for the plan dimensions of the lid and container; rather, they are used to denote the orientation of the lids and containers in relation to their line of movement. Thus, the seals between the lid and container may be made first along the longer of their two pairs of sides and subsequently along their shorter sides, or vice versa; furthermore, the four sides of the lid and container may be of the same length.

Where the side portions of the lid are sealed to the upper surfaces of the side portions of the flange, it is generally more convenient to form the V-section recesses by bending down the side portions of the flange.

Figure 2:
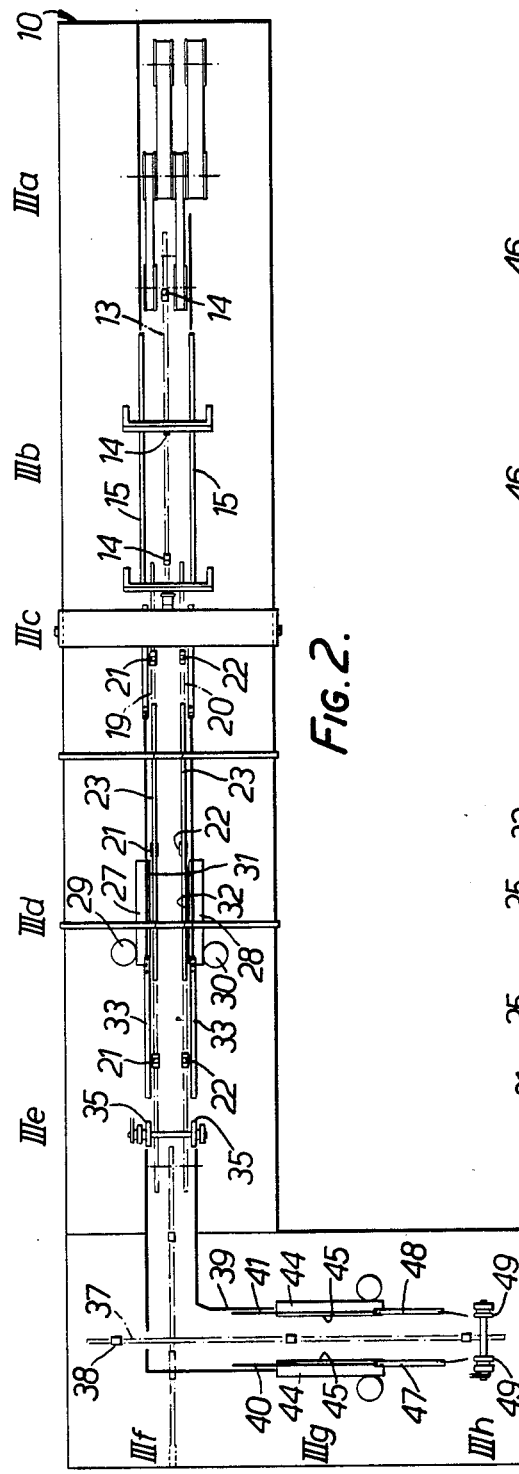
Figure 5:
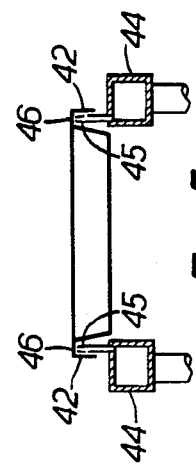
Figure 4:
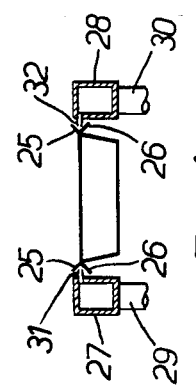

A specific embodiment of the invention will now be described by way of example and with reference to the accompanying drawings, in which:

FIG. 1 is a diagrammatic elevation of a machine for carrying out the method of the invention, FIG. 2 is a plan view of the machine of FIG. 1, FIGS. 3a to 3h show plan and elevational views of a container at eight different positions, marked IIIa to IIIh in FIG. 2, as the container passes through the machine, FIG. 4 is a section on line IV—IV of FIG. 3d, and FIG. 5 is a section at line V—V of FIG. 3g.

The machine shown comprises an infeed section 10 which receives a random infeed of tray-like containers 11 (FIG. 3a). Each container 11 is generally rectangular in plan and has a horizontal peripheral flange 12.

A driving chain 13 provided with pusher dogs 14 cooperates with guides 15 to feed a series of the trays 11 from the infeed section 10 to the position IIIc where flat lids 16 are delivered from a chute 17 by an intermittently operated device 18, in timed relationship so as to position a lid on top of each container 11 as shown in FIG. 3c.

A pair of driving chains 19, 20 provided with pusher dogs 21, 22 now take over propulsion of the containers 11. Profiled strips 23, 24 along the sides of the track are arranged to bend the side portions 25 of the lid margin upwards and/or the side portions 126 of the container flange downwards, so as to produce V-shaped recesses along the sides of the container as seen in FIGS 3d and 4. The included angle of these recesses may be of any suitable value, and may, for example, be a right angle. Although both side portions 25 of the lid and side portions 26 of the container flange may be bent as shown, it is generally more convenient to bend only the container flange since this has already a fold line about which it has been bent and can therefore readily be further bent.

Square tubes 27, 28 on opposite sides of the track are supplied with hot air through tubes 29, 30 and have longitudinal nozzles 31, 32 through which the hot air is directed into the recesses so as to heat the surfaces of the side portions 25, 26.

The container 11 and lid 16 both being of a cardboard material coated on their interior surface with polyethylene terephthalate in known manner in order to render them heat resistant, the heating of the side portions 25, 26 softens the coating on those portions and renders it adhesive.

A second pair of profiled strips 33, 34 on each side of the track is then provided to bring the side portions 25, 26 back to the horizontal, whereupon they pass between vertically acting pairs of pressure rollers 35, 36 which seal them together through the adhesive coatings, as shown in FIG. 3e.

The containers are then re-arranged in orientation relative to the direction of feed in order to seal the ends of the lids to the ends of the container flanges. As shown, this is effected by use of a right angle crossfeed in the form of a chain 37 with pusher dogs 38. As the pusher dogs 38 move the containers down the right angle branch 39 of the track, a pair of profiled strips 40, 41 bend the extreme end portions 42 of the lid margin down into the vertical position as shown in FIGS. 3g and 5, so that approximately right-angled recesses are formed between the end portions 42 and the underside of the end portions 46 of the container flanges. Hollow tubes 44 with elongated nozzles 45 deliver hot air into these recesses to soften the adhesive coating presented to the recesses by the lid, and to heat the cardboard material of the end portions 42, 46. Finally, a further pair of profiled strips 47, 48 bend the portions 42 of the lid up under the end portions 46 of the flange, and a further pair of pressure rollers 49 apply vertically directed pressure to seal the portions 42 and 46 together.

It will be appreciated that the end portions 42 of the lid margins are extended beyond the end portions 46 of the container flange in order to enable this method of sealing to be adopted. Further, as shown, tabs 50 are provided on the end portions 42 to assist in removal of the lid 16 when desired. The tabs 50 will in general not be sealed to the container, though a weak peelable seal could be provided if desired.

The sealing of the end portions 42 to the lower surface of the container flange rather than to its upper surface (as for the side portion 25) is primarily because otherwise the seals formed between the side portions 25, 26 would restrict the separation of the end portions to provide access for the hot air for sealing. However, in some applications (for example, where the container and lid have well-rounded corners) it is possible to employ for the end portions a similar sealing arrangement to that described above for the side portions. The lid is thereby attached to the upper surface of the container flange around substantially the whole of the container periphery.

Conversely, it may be desirable to form the seals between the side portions 25, 26 in a similar way to that described and shown for the end portions 42, 46. Such an arrangement, which requires wide side portions 25 on the lid similar to the end portions 42, obviates the need to make seals between the interior surfaces of the lid and containers and accordingly is of value where for example, those surfaces are for any reason not satisfactorily or readily heat-sealable together. The arrangement may also be of particular value in applications where the dimensions of the container may vary widely so that, unless the lid margin is extended around and beneath the container flange around substantially the whole of the container periphery, a poorly closed and visually unappealing pack may result in which part of the container flange remains uncovered.

Instead of using a branch at right angles for the application of the end seals as described above, it would be possible to turn the containers 11 through 90° and to continue the feed on the same line as the main portion of the feed while effecting the end seals.

While the apparatus described above is arranged to bend the side and end portions 25, 42 of the lid and the side portions 26 of the container flange after the lid 16 has been positioned on the container, such bending could be at least partially effected before the lid is positioned. Furthermore the lid, although possibly planar when applied to the container, may have its material "broken" to assist sealing, by creasing and/or bending it around its margin prior to application to the container.

The seals between the lid and container flange along the sides and/or at the ends of the container may be either continuous or discontinuous. Discontinuous seals may be formed by use of serrated pressure rollers 35, 49, to ensure that the seal is peelable, to avoid delamination of the coating and to provide a vent for the container.

In another modification, end portions of the lid may be sealed to the upper surfaces of the flanges on the ends of the container without bending either the end portions of the lid or the end flanges of the container. Such sealing of the end portions follows sealing of the side portions 25, 26 as shown in FIGS. 1, 2, 3a to 3e and 4. No extended end portions 42 of the lid are necessary in this instance. The end portions to be sealed are passed between opposed hot air nozzles directed upwards and downwards from the horizontally disposed limb of a U-shaped nozzle head, so that the adhesive coatings (which must be such as to become tacky at a relatively low temperature) are heated through the board material of the lid and flange. After passing between the limbs of the nozzle head, the end portions are engaged by pressure rollers to complete the seal.

I claim:

1. A method of sealing separate flat lids at margins thereof onto a series of generally rectangular tray-like containers having peripheral horizontal flanges, comprising the steps of:
   (a) moving the containers along a line while positioning lids on the containers, with the margin of each lid located above the peripheral flange of a respective container,
   (b) bending marginal side portions of the lid and/or side portions of the flange of the container so that, with the lid positioned over the container, a V-section is formed between the side portions of the lid and flange along each of opposed sides of the container parallel to the line of movement,
   (c) providing a heat-activatable adhesive in said recesses,
   (d) directing hot gas into the recesses to activate the adhesive within said recesses and to heat the side portions of the lid and flange,
   (e) pressing the side portions of the lid and flange into mutual contact to seal them together,
   (f) changing the movement of the containers so that what were previously marginal end portions of the lid and end portions of the flange are presented at each side of the line of movement, and
   (g) sealing said end portions of the lid and flange together,
said steps (a) through (g) being performed progressively and in serial relation with said container being moved continuously along the line from step (a) through step (g).

2. A method according to claim 1, characterised in that the side portions of the lid are sealed to the upper surfaces of the side portions of the flange, and the V-section recesses are formed by bending down the side portions of the flange.

3. A method according to claim 1, characterized in that said bending of the side portions of the lid and/or of the flange is effected after the lid has been positioned, by a profiled strip on each side of the line of movement acting as a plough within said recess.

4. A method according to claim 1, characterized in that the sealing of the marginal end portions of the lid to the end portions of the container flange is effected by:
   bending downwards the end portions of the lid beyond the end portions of the container flange, so as to form further recesses beneath the flange end portions,
   providing a heat-activatable adhesive in said further recesses,
   directing hot gas into the further recesses to activate the adhesive within them and to heat the end portions of the lid and flange, and
   pressing the end portions of the lid up against the undersides of the end portions of the flange to seal them thereto.

5. A method according to claim 1, characterized in that the sealing of the marginal end portions of the lid to the end portions of the container flanges is effected by:
   bending the end portions of the lid and/or the end portions of the container flange to form further V-shaped recesses between them; providing a heat-activatable adhesive in said further recess,
   directing hot gas into the further recesses to activate the adhesive within them and to heat the end portions of the lid and flange, and
   pressing the end portions of the lid and of the container flange into contact to seal them together.

6. A method according to claim 4 or claim 5, charactersed in that the pressing of the side and end portions of the lid and of the container flange into contact is effected by pairs of vertically acting pressure rollers disposed above and below the side and end portions.

7. A method according to claim 1, characterized in that the hot gas is directed into the recesses from spaced-apart elongated nozzles arranged parallel to the line of movement and oriented to emit hot gas in opposing, generally horizontal directions.

8. A method according to claim 1, characterized in that the change of movement of the containers is effected by turning the line of movement through 90° while leaving the orientation of the containers unchanged.

9. A method according to claim 1, characterized in that the change of movement of the containers is effected by rotating each container through 90°.

10. A method according to claim 1, characterized in that the heat-activatable adhesive is provided by overall heat-resistant polyester coatings on the interior surfaces of the lids and containers.

* * * * *